UNITED STATES PATENT OFFICE.

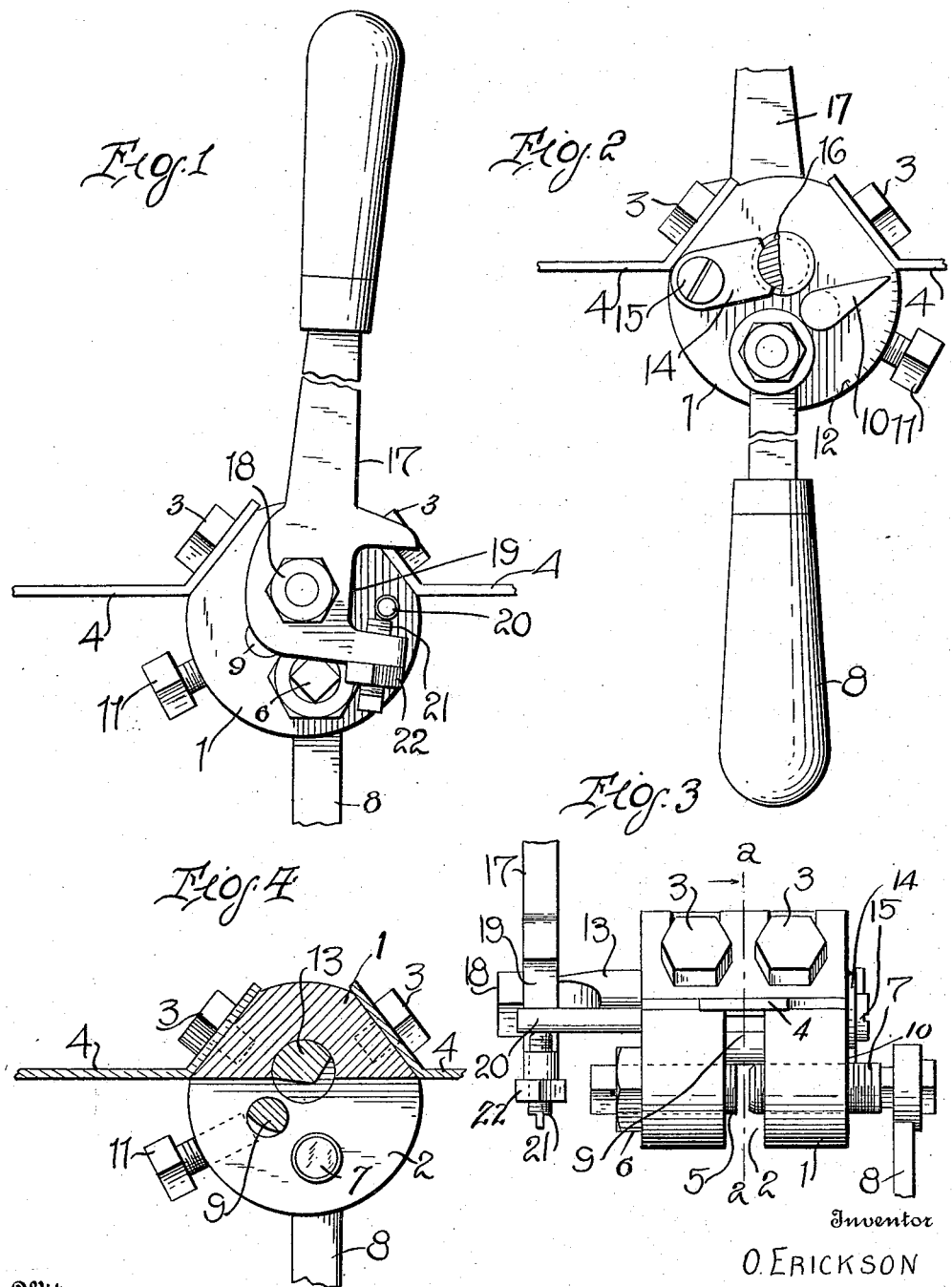

OLE ERICKSON, OF ELMA, WASHINGTON.

SAW-SWAGE.

1,191,411.   Specification of Letters Patent.   Patented July 18, 1916.

Application filed August 22, 1914. Serial No. 858,055.

*To all whom it may concern:*

Be it known that I, OLE ERICKSON, a citizen of the United States, residing at Elma, in the county of Chehalis and State of Washington, have invented certain new and useful Improvements in Saw-Swages, of which the following is a specification, reference being had to the accompanying drawings.

My invention relates to certain new and useful improvements in saw swages, and has for its object comparative simplicity of construction, economy in manufacture, durability and accuracy in operation.

With these and other objects in view my invention consists in the details of construction and arrangement hereinafter more particularly described.

In order that those familiar with the art to which the invention appertains may know how to make and use the swage and appreciate its advantages, I will now describe the same, referring by numerals to the accompanying drawing, in which—

Figure 1 is an elevation of that side upon which the operating lever is located. Fig. 2 is a similar view of the opposite side. Fig. 3 is an end view and Fig. 4 is a section on the line a—a of Fig. 3, looking in the direction indicated by the arrow.

Similar reference numerals indicate like parts in the several figures of the drawing.

1 represents the stock formed with a saw receiving slot 2. Above this slot adjustably secured to the stock by headed screws 3, are two saw gage plates 4—4 adapted to rest upon the saw teeth.

Threaded in one side of the stock 1, is a clamping screw 5, with an integral head or collar 6 adapted to contact with the stock 1, and in the other side, and in axial alinement therewith, is another clamping screw 7, provided with a lever handle 8, the purpose of these two screws being to clamp the saw firmly within the slot 2, with the tooth to be swaged located upon the anvil 9, the ends of which are cylindrical and are rotatably journaled in the stock 1, at each side of the slot 2. This anvil is formed at one end with a radial arm 10, by which it is rotated to adjust the central portion properly to the saw tooth, when it is then fixed in its adjusted position by a set screw 11. Graduation marks 12 are provided on the side of the stock to determine the adjustment of the anvil in an obvious manner.

Above the clamping screws 5 and 7 and the anvil 9, is a die 13, the ends of which are cylindrical and journaled in the stock. One end of this die projects slightly beyond the stock and is held against longitudinal movement by means of a short plate 14, secured by a screw 15, to the stock, and having its end fashioned to be seated in a circumferential groove 16 in the end of the die as most clearly shown on Fig. 2. The other end of this die is squared to receive an operating handle 17, and then reduced and threaded to receive a nut 18 by means of which the handle is securely fixed to the die. This handle is formed with a lateral gateway or opening 19, to straddle a stop 20 secured in the stock, which stop limits the angular movement of the handle and the consequent oscillation of the die. One side of this gateway is provided with a screw 21, and a jam nut 22 by means of which the degree of angular movement of the handle is regulated, as the inner end of the screw contacts with the stop 20 as clearly shown in Fig. 1.

From the construction of the die 13 and the manner in which it is secured to the stock, it will readily be seen that the die can be easily removed for repair or substitution by simply removing the locking plate 14 and that the anvil 9 can be withdrawn from the stock. The clamping screws and the gage plates can likewise be readily removed from the stock, so that it will be seen that all of the parts of my improved swage may be made independently and quickly assembled and readily adjusted and that being interchangeable the several parts may all be readily repaired or other parts substituted.

It is to be particularly noted that the stock or body 1 is formed on opposite sides of its vertical transverse axis with downwardly diverging flat faces against which the slotted bases of the gage plates 4 bear. There are two slots in each base, as illustrated most clearly in Fig. 3, with which slots the screws 3 engage. By reason of the fact that there are two slots in each base for the passage of the screws 3, the gage plates cannot shift laterally or rotate on their longitudinal axis, and by reason of the fact that the faces of the stock against which the bases of the gage plates rest are flat and obliquely disposed relative to the axis of the die 13 the gage plates will always be disposed in the same or parallel planes. If the gage plates are properly adjusted they will be disposed in the same plane and there will be no chance of the gage plates being disposed in angular relation to each other as would be the case were the bases of the gage plates rounded and fitting upon the rounded periphery of a stock. Thus both gage plates are always horizontal.

I have found that with my improved swage, a saw can be readily swaged in a fractional portion of the time necessary where the ordinary hand tools and hammering are resorted to.

What I claim as new and desire to secure by Letters Patent is:—

1. In a saw swage, a stock having a transverse saw receiving slot on its under face and formed with a die receiving passage intersecting said slot, a die disposed in the passage, an anvil also passing through the stock in conjunction with the die, the stock being formed with oppositely disposed flat downwardly inclined divergent faces extending obliquely to the axis of the die, gage plates disposed on the stock on each side of the die, each gage plate having a slotted face engaging with one of the flat faces of the stock, and clamp screws passing through the slots in the gage plates and holding them in adjusted positions.

2. In a saw swage, a stock having a transverse saw receiving slot on its under face, a die passing transversely through the stock and intersecting the slot, an anvil coöperating with the die, the opposite faces of the stock on each side of the die and above the same being flat and downwardly and outwardly inclined obliquely to the axis of the die, gage plates disposed on the stock on each side of said die, each gage plate having a base engaging the adjacent flat face of the stock, each base having a plurality of longitudinally extending slots, and clamp screws passing through the slots in each gage plate and entering the stock and holding the gage plates in adjusted position, the plurality of slots and clamp screws holding the gage plates in parallel relation to the axis of the die.

In testimony whereof I hereunto affix my signature in the presence of two witnesses.

OLE ERICKSON.

Witnesses:
A. E. LE ROY,
W. A. COMBES.

Copies of this patent may be obtained for five cents each, by addressing the "Commissioner of Patents, Washington, D. C."